United States Patent [19]
Ishikawa

[11] Patent Number: 6,160,658
[45] Date of Patent: Dec. 12, 2000

[54] OPTICAL AMPLIFIER FOR WAVELENGTH MULTIPLEXING OPTICAL TRANSMISSION

[75] Inventor: Yukiko Ishikawa, Tokyo, Japan

[73] Assignee: NEC Corporation, Japan

[21] Appl. No.: 08/962,223

[22] Filed: Oct. 31, 1997

[30] Foreign Application Priority Data

Nov. 1, 1996 [JP] Japan .................................. 8-291532

[51] Int. Cl.[7] .............................. G02F 1/35; H01S 3/10; H04B 10/02
[52] U.S. Cl. ......................... 359/337; 359/130; 359/341
[58] Field of Search .................................. 359/124, 130, 359/337, 341, 346

[56] References Cited

U.S. PATENT DOCUMENTS

| | | | |
|---|---|---|---|
| 5,532,864 | 7/1996 | Alexander | 359/177 |
| 5,541,766 | 7/1996 | Mizrahi et al. | 359/337 |
| 5,598,294 | 1/1997 | Uno et al. | 359/341 |
| 5,636,054 | 6/1997 | Artigaud et al. | 359/341 |

FOREIGN PATENT DOCUMENTS

| | | |
|---|---|---|
| 1-196189 | 8/1989 | Japan . |
| 4-86728 | 3/1992 | Japan . |
| 4-241328 | 8/1992 | Japan . |
| 5-5912 | 1/1993 | Japan . |
| 5-29683 | 2/1993 | Japan . |
| 5-63265 | 3/1993 | Japan . |
| 5-235442 | 9/1993 | Japan . |
| 6-196786 | 7/1994 | Japan . |
| 6-342175 | 12/1994 | Japan . |
| 7-15074 | 1/1995 | Japan . |
| 7-336327 | 12/1995 | Japan . |
| 8-5510 | 1/1996 | Japan . |

OTHER PUBLICATIONS

E. Desurvire, Erbium Doped Fiber Amplifiers, John Wiley & Sons, Inc., ISBN0–471–59877–2, pp. 315, 316, and 469–476, 1994.

Apida et al, Journ. Electron. Info. Communic. Society, Thesis B–I, vol. J75–B–I, #5, pp 298–303, May 1992.

*Primary Examiner*—Nelson Moskowitz
*Attorney, Agent, or Firm*—Ostrolenk, Faber, Gerb & Soffen, LLP

[57] ABSTRACT

An optical amplifier for wavelength multiplexing optical transmission has an optical amplifier for amplifying wavelength-multiplexed signal light in which signal lights having wavelengths different from each other are wavelength-multiplexed and outputting the amplified wavelength-multiplexed signal light from an output terminal, and a light-removing portion which is disposed along the light path after the optical amplifier and removes spontaneous emission light existing between the wavelengths of the signal lights included in the amplified wavelength-multiplexed signal light.

14 Claims, 3 Drawing Sheets

OPTICAL AMPLIFIER FOR WAVELENGTH MULTIPLEXING OPTICAL TRANSMISSION

FIELD OF THE INVENTION

This invention relates to an optical amplifier used in an optical transmission system, and more particularly to, an optical amplifier for amplifying a wavelength-multiplexed signal that several optical signals with different wavelengths are wavelength-multiplexed.

BACKGROUND OF THE INVENTION

When multistage optical amplifiers are connected to conduct long-distance optical communication, there occurs amplified spontaneous emission (hereinafter referred to as 'ASE') from the multistage optical amplifiers themselves. This ASE is superposed on an optical signal while the optical signal is propagated from an optical transmitter to an optical receiver, thereby deteriorating the signal-to-noise ratio of the optical signal.

Conventionally, there are several methods of removing ASE: 1) a method of transmitting only the wavelength of signal light by a narrow-band pass filter (Japanese patent application laid-open No. 4-241328 (1992)); 2) a method of blocking ASE generated inside an optical amplifier by an optical switch during the OFF term of a signal light pulse (Japanese patent application laid open No. 5-5912 (1993)); 3) a method of inserting a polarization separating element into the output of an optical amplifier to extract signal light by using the linear polarization of signal light (Japanese patent application laid-open Nos. 6-196786 (1994) and 5-235442 (1993)); 4) a method of adding an ASE-absorbing element in the cladding of a rare earth element doped optical fiber as an amplifier medium to remove ASE propagating through the core (Japanese patent application laid-open No. 6-342175 (1994)); 5) a method of inserting an Er-doped optical fiber in the midst of an Er-Al-doped optical fiber to remove ASE by using an absorption characteristic of the Er-doped optical fiber (Japanese patent application laid-open No. 5-29683 (1993)); and 6) a method of removing ASE wavelength light by inserting a wave filter in the midst of a rare earth element doped optical fiber as an amplifier medium or by using bending losses of optical fiber to wavelength light and ASE wavelength light (Japanese patent application laid-open No. 4-86728 (1992)).

However, all these conventional methods relate to an optical amplifier for single-wavelength optical transmission and are not suitable for amplifying a wavelength multiplexed optical signal. Namely, in the method 1), the narrow-band pass filter has the characteristic of passing only light with a specific wavelength. Therefore, when several signal lights with different wavelengths are amplified, only one of the signal lights can be passed through, but the other signal lights cannot be passed through.

Also, in the method 2), when several signal lights with different wavelengths are used, an ON signal of one signal light may be canceled by switching off the optical switch in the OFF term of specific signal light since ON/OFF terms of signal pulse in the signal lights are different from each other.

Furthermore, in the method 3), the polarization states of lights to be propagated through an optical fiber cannot be kept stable unless an optical fiber with a particular structure is used. In general, in an optical fiber to be used as a transmission line, there may occur a stress due to the bending of the optical fiber and a variation of refractive index inside the optical fiber due to a change in surrounding temperature. Thus, there occurs a temporal fluctuation in the polarization direction of signal light propagating through the optical fiber. Moreover, the degree of fluctuation is different depending on wavelength. Therefore, in case of multi-wavelength optical transmission, it is substantially impossible that the polarization states of all wavelengths signal lights are unified.

In the methods 4), 5) and 6), ASE is absorbed or attenuated over the entire wavelength band of several tens nm including the signal light wavelength. Therefore, when the absorption or attenuation ratio of ASE is increased, the signal light wavelength must be also attenuated.

Thus, none of the conventional methods of removing ASE cannot give an improved signal-to-noise ratio in optical amplification of wavelength-multiplexed optical signal.

SUMMARY OF THE INVENTION

Accordingly, it is an object of the invention to provide an optical amplifier which can given an improved signal-to-noise ratio in optical amplification of wavelength-multiplexed optical signal.

According to the invention, an optical amplifier for wavelength multiplexing optical transmission, comprises:

an optical amplifying means for amplifying wavelength-multiplexed signal light where signal lights with wavelengths different from each other are wavelength-multiplexed and outputting the amplified wavelength-multiplexed signal light from an output terminal; and a light-removing means which is disposed after the optical amplifying means and removes spontaneous emission light existing between the signal lights' wavelengths included in the amplified wavelength-multiplexed signal light.

BRIEF DESCRIPTION OF THE DRAWINGS

The invention will be explained in more detail in conjunction with the appended drawings, wherein.

DESCRIPTION OF THE PREFERRED EMBODIMENTS

An optical amplifier for wavelength multiplexing optical transmission in the first preferred embodiment will be explained in FIG. 1.

Figure 1:
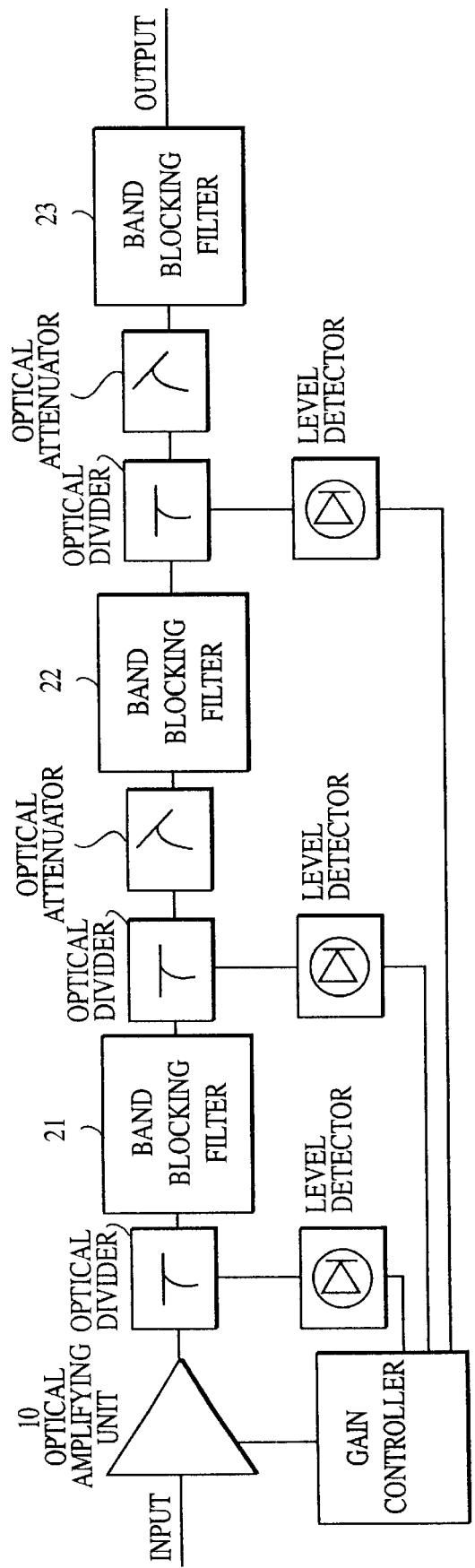
FIG. 1 is a block diagram showing an optical amplifier for wavelength multiplexing optical transmission in a first preferred embodiment according to the invention.

In FIG. 1, an optical amplifying unit 10 has the function of amplifying simultaneously wavelength-multiplexed signal lights to be input. Such an optical amplifying unit may be composed of an optical fiber amplifier which is provided with a rare earth element doped fiber, such as an Er-doped fiber, and an excitation light source, or a semiconductor optical amplifier. This invention is characterized by that a light-removing unit for removing ASE is disposed after the optical amplifying unit 10.

In the first embodiment, the light-removing unit is composed of band blocking filters 21 to 23 which are, as shown in FIG. 1, in series connected. Herein, the invention will be described with respect to an example in which signal lights with four wavelengths are multiplexed. However, this invention can be, of course, applied to wavelength multiplexing with more wavelengths.

The band blocking filter has the function of selectively reflecting light with a wavelength existing between neighboring wavelengths of signal lights to be wavelength-multiplexed. Such an optical element may be composed of, for example, an optical fiber grating, where a grating with a micro-pitch for selectively reflecting only light with a specific wavelength and transmitting the remainder lights as they are is formed in the optical fiber.

Figure 3:
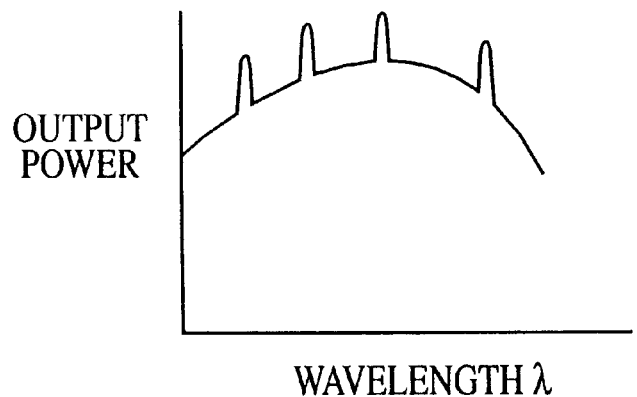
FIG. 3 is a spectrum of wavelength-multiplexed signal light just after passing through an optical amplifying unit 10 in FIG. 1.

FIG. 3 shows a spectrum of wavelength-multiplexed signal light to be output from the optical amplifying unit 10. In this example, where four wavelengths are multiplexed, all the signal lights are simultaneously amplified and ASEs generated between the wavelengths of the signal lights are also amplified. The band blocking filters in the first embodiments have the function of selectively reflecting lights at three wavelength regions existing between four peak wavelengths in FIG. 3, the wavelengths of the signal lights.

Figure 4:
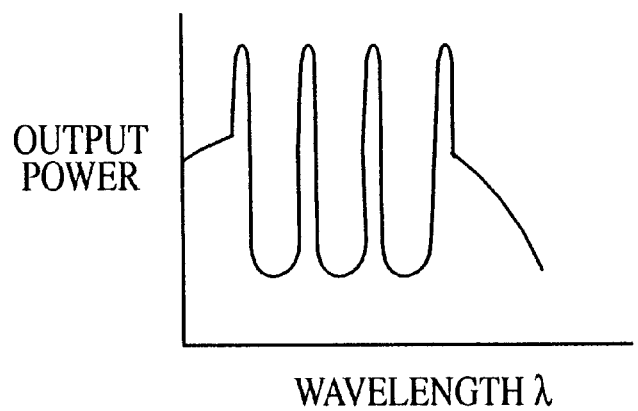
FIG. 4 is a spectrum of wavelength-multiplexed signal light just after passing through a band blocking filter 23 in FIG. 1.

By using this composition, ASEs included in the wavelength-multiplexed signal light amplified by the optical amplifying unit 10 are removed through the band blocking filters 21 to 23 connected to the optical amplifying unit 10. As the result of the selective blocking of unnecessary wavelength lights and the removal of ASEs existing between the wavelengths of the signal lights, amplified light with main components composed of only the signal lights can be obtained as shown in FIG. 4. In the light spectrum in FIG. 4, ASEs at wavelength regions outside both ends of the four signal lights can be removed by using a typical narrow band filter, e.g., a narrow band filter disclosed in Japanese patent application laid-open No. 4-241328 (1992).

Figure 5:
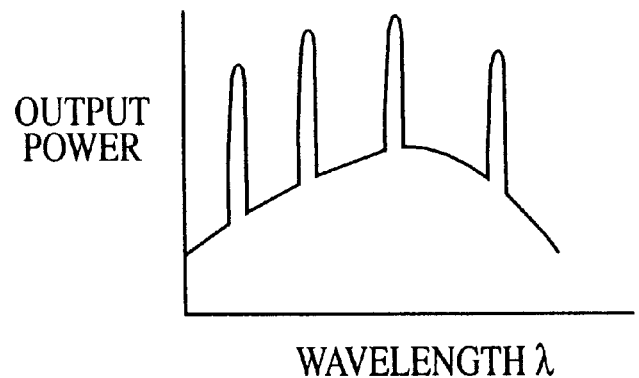
FIG. 5 is a spectrum of wavelength-multiplexed signal light just after passing through port 3 of an optical circulator 41 in FIG. 2.

Next, an optical amplifier for wavelength multiplexing optical transmission in the second preferred embodiment will be explained in FIGS. 2, 3 and 5.

Figure 2:
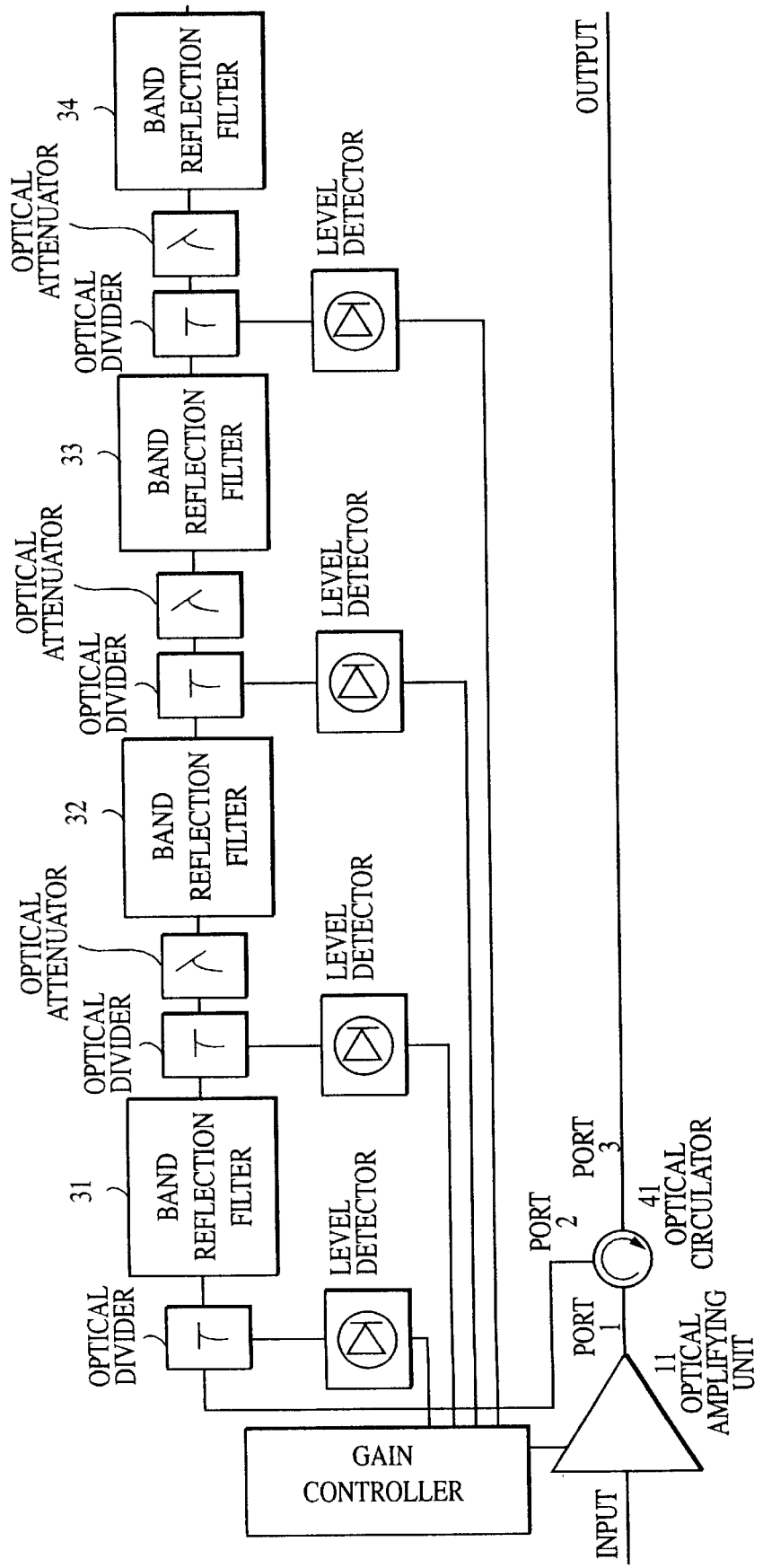
FIG. 2 is a block diagram showing an optical amplifier for wavelength multiplexing optical transmission in a second preferred embodiment according to the invention.

In FIG. 2, an optical amplifying unit 11 has the same function as the optical amplifying unit 10 and amplifies and outputs simultaneously wavelength-multiplexed signal lights. Therefore, the light spectrum of the amplified signal lights becomes similar to that shown in FIG. 3.

In the second embodiment, the composition of a light-removing unit positioned along the signal light path downstream from the optical amplifying unit 11 is different from that in the first embodiment. Namely, in the second embodiment, the output of the optical amplifying unit 11 is connected to port 1 of an optical circulator 41 and band reflection filters 31 to 34 are in series connected to port 2 of the optical circulator 41.

The basic function of the optical circulator 41 is to output wavelength-multiplexed signal light which is input from the optical amplifying unit 11 to port 1 and from port 2 and to output light which is input to port 2 from port 3. Thus, light to be input to port 1 is supplied to the band reflection filter 31 which is directly connected to port 2.

The band reflection filters 31 to 34 have the function of selectively reflecting only one signal light with a specific wavelength and transmitting the other light with a wavelength other than the specific wavelength. Thus, at the first-stage band filter 31, only one signal light of four signal lights is reflected, and the other three signal lights are transmitted therethrough as they are. Then, at the second-stage band filter 32 connected after that, one of the three signal lights except the first reflected signal light is selectively reflected. Similarly, the other signal lights are in due order reflected at the corresponding band reflection filters. Light not reflected at any band reflection filter, i.e., ASE is, as it is, transmitted to the right hand in FIG. 2.

As a result, only the amplified signal lights are input back to port 2 of the optical circulator 41 and then are output from port 3 to an optical transmission line (not shown). Meanwhile, the band reflection filters with the above-mentioned function may also be composed of an optical fiber grating. FIG. 5 shows a spectrum of the signal lights output from port 3 of the optical circulator 41, where it is proved that light with wavelengths other than those of the signal lights is removed.

Next, modifications of the first and second embodiment, which can further improve the performance of an optical amplifier for wavelength multiplexing optical transmission of the invention, will be explained below.

In the optical amplifier for wavelength multiplexing optical transmission in the first or second embodiment, there may occur a dispersion in the peak values of the signal lights of the amplified wavelength-multiplexed signal light. In general, there is a tendency that the level of amplified signal light is reduced according as the wavelength departs from a specific wavelength. In this case, an optical attenuator where the amount of attenuation is set to keep the final output level constant can be disposed between the optical amplifying unit 10 and the band blocking filters 21 to 23 in FIG. 1 or between the band reflection filters 31 to 34 in FIG. 2. Thus, the respective levels of the signal lights after optically amplifying and removing unnecessary light can be kept constant between the wavelengths.

Also, in addition to the above optical attenuator, the optical amplifier for wavelength multiplexing optical transmission can be further composed of a monitoring unit (not shown) to monitor the level of reflected light of the band blocking filter 21 in FIG. 1 or the band reflection filters 31 to 34 in FIG. 2, and a gain controller (not shown) to control the gain of the optical amplifying unit according to the level. By using this composition, the level of ASE existing between signal lights in FIG. 1 or the levels of signal lights in FIG. 2 can be monitored, thereby controlling the gain of the optical amplifying unit 10 or 11 according to the monitored level so as to obtain a desired output level.

The monitoring unit may be composed of an optical divider which is disposed between the optical amplifying unit and the selective light reflection units or between the selective light reflection units and divides the reflected light, then outputting the divided light, and a level detector for detecting the level of the divided light.

Furthermore, the level detector may be disposed before each of the band blocking filters 21 to 23 or each of the band reflection filters 31 to 34. In this case, by subtracting a level of divided light detected at a level detector from a level of divided light detected at another level detector positioned closer along the light path to the optical amplifying unit, the level of reflected light at each of the selective reflection units can be detected.

The gain controller is characterized in that the gain of the optical amplifying unit is controlled according to the minimum level of the levels of reflected lights to be detected. Therefore, all the signal lights can have a constant level after the optical amplification.

The test results of the first and second embodiments will be described below.

In the first embodiment, used as the optical amplifying unit 10 is an optical fiber amplifier with an amplification medium of an Er-doped optical fiber, where 1540 nm, 1545 nm, 1550 nm and 1555 nm signal lights are amplified. Also, used as the band blocking filters 21 to 23 are optical fiber gratings for clocking wavelengths of 1542.5 nm, 1547.5 nm and 1552.5 nm. In each of the optical fiber gratings, an insertion loss of signal light is 0.5 dB and a half width of blocking region is set to be 2 nm. Also, the loss of a transmission wavelength other than signal lights in the optical fiber gratings is 30 dB, and the level of ASE is therefore reduced by 30 dB.

In the second embodiment, wavelength-multiplexed signal lights are input to the optical amplifying unit 11, then amplified and output together with ASE (FIG. 3). The optical circulator 41 is disposed to remove the ASE part, and the band reflection filters 31 to 34, whose number corresponds to the number of signal lights, are in series connected to port 2 of the optical circulator 41. Thus, only the necessary signal lights can be transmitted as shown in FIG. 5. For the test, used as the optical amplifying unit 11 is an optical fiber amplifier with an amplification medium of an Er-doped optical fiber, where 1540 nm, 1545 nm, 1550 nm and 1555 nm signal lights are amplified. Also used as the band reflection filters 31 to 34 are optical fiber gratings for reflecting the wavelengths of 1540 nm, 1545 nm, 1550 nm and 1555 nm and transmitting wavelengths of 1542.5 nm, 1547.5 nm and 1552.5 nm, which are connected to port 2 of the optical circulator 41 so as to take out only the necessary signal lights from port 3.

In each of the optical fiber gratings, an insertion loss of signal light is 0.5 dB and a half width of blocking region is set to be 0.5 nm. Also, the loss of a transmission wavelength other than signal lights in the optical fiber gratings is 25 dB. Thus, ASE reflected by the four optical fiber gratings are accumulated and then supplied to port 2 of the optical circulator 41. Therefore, ASE included in light output from port 3 is reduced by 19 dB comparing to ASE included in the output of the optical amplifying unit 11.

Although the invention has been described with respect to specific embodiment for complete and clear disclosure, the appended claims are not be thus limited but are to be construed as embodying all modifications and alternative constructions that may be occurred to one skilled in the art which fairly fall within the basic teaching here is set forth.

What is claimed is:

1. An optical amplifier for wavelength-multiplexing optical transmission, comprising:

an optical amplifier for amplifying wavelength-multiplexed signal light in which signal lights with wavelengths different from each other are wavelength-multiplexed, and outputting said amplified wavelength-multiplexed signal light from an output terminal of said optical amplifier; and a light-removing section which is connected in series following said optical amplifier and removes spontaneous emission light existing between the wavelengths of said wavelength-multiplexed signal lights included in said amplified wavelength-multiplexed signal lights, wherein said light-removing section comprises a plurality of selective light reflectors connected in series following said optical amplifier.

2. An optical amplifier for wavelength multiplexing optical transmission according to claim 1, wherein:

each of said plurality of selective light reflectors reflects light having a wavelength between two respective neighboring wavelengths of said wavelength-multiplexed signal lights and for allowing said signal lights to be transmitted therethrough.

3. An optical amplifier for wavelength multiplexing optical transmission according to claim 2, wherein:

said plurality of selective light reflectors corresponds in number to the number of said signal lights which are wavelength-multiplexed, said plurality of selected light reflectors being connected in series.

4. An optical amplifier for wavelength multiplexing optical transmission according to claim 2, wherein:

said selective light reflectors each comprises an optical fiber grating.

5. An optical amplifier for wavelength multiplexing optical transmission according to claim 3, wherein:

said selective light reflectors each comprises an optical fiber grating.

6. An optical amplifier for wavelength multiplexing optical transmission according to claim 2, wherein:

said light-removing section further comprises an optical attenuator which attenuates light passing through said selective light reflectors at a predetermined rate.

7. An optical amplifier for wavelength multiplexing optical transmission according to claim 3, wherein:

said light-removing section further comprises an optical attenuator which attenuates light passing through said selective light reflectors at a predetermined rate.

8. An optical amplifier for wavelength multiplexing optical transmission according to claim 1, wherein:

said monitoring unit comprises a light divider which is disposed between said optical amplifier and said selective light reflectors and between adjacent ones of said selective light reflectors to divide said reflected light and then output said divided light, and a level detector for detecting a level of said divided light.

9. An optical amplifier for wavelength multiplexing optical transmission according to claim 2, wherein:

said monitoring unit means comprises a light divider which is disposed between said optical amplifier and said selective light reflectors and between adjacent ones of said selective light reflectors to divide said reflected light and then output said divided light, and a level detector for detecting a level of said divided light.

10. An optical amplifier for wavelength multiplexing optical transmission according to claim 8, wherein:

said monitoring unit comprises a plurality of said level detectors, and wherein a level of said reflected light at each of said selective light reflectors is detected by subtracting a level of divided light to be detected at one of said plurality of level detectors from a level of divided light to be detected at another level detector positioned closer to said optical amplifier.

11. An optical amplifier for wavelength multiplexing optical transmission according to claim 9, wherein:

said monitoring unit comprises a plurality of said level detectors, and wherein a level of said reflected light at each of said selective light reflectors is detected by subtracting a level of divided light to be detected at one of said plurality of level detectors from a level of divided light to be detected at another level detector positioned closer to said optical amplifier.

12. An optical amplifier for wavelength multiplexing optical transmission according to claim 10, wherein:

said gain controller controls a gain of said optical amplifier according to a minimum level of said detected levels of said reflected lights to be detected at said plurality of level detectors.

13. An optical amplifier for wavelength multiplexing optical transmission according to claim 11, wherein:

said gain controller controls a gain of said optical amplifier according to a minimum level of said detected levels of said reflected lights to be detected at said plurality of level detectors.

14. An optical amplifier for wavelength multiplexing optical transmission according to claim 2, further comprising a narrow band filter for removing light in the wavelength regions outside a wavelength range from the wavelength of the signal light having the largest wavelength in the wavelength-multiplexed signal lights to the wavelength of the signal light having the smallest wavelength in the wavelength-multiplexed signal lights.

* * * * *